United States Patent [19]

Erlichman et al.

[11] Patent Number: 4,547,784
[45] Date of Patent: Oct. 15, 1985

[54] THERMAL RECORDING SYSTEM AND METHOD

[75] Inventors: Irving Erlichman, Wayland; Robert W. Hausslein, Lexington, both of Mass.

[73] Assignee: Polaroid Corporation, Cambridge, Mass.

[21] Appl. No.: 685,715

[22] Filed: Dec. 24, 1984

[51] Int. Cl.[4] .......................... B41J 3/20; B41M 5/18
[52] U.S. Cl. .............................. 346/76 PH; 400/120; 219/216; 250/318; 346/1.1
[58] Field of Search ............... 346/76 PH, 76 R, 1.1; 400/120; 219/216; 250/317.1, 318, 319, 316.1; 355/3 FU, 14 FU

[56] References Cited

U.S. PATENT DOCUMENTS

| | | | |
|---|---|---|---|
| 3,577,137 | 5/1971 | Brennan | 340/324 |
| 4,064,205 | 12/1977 | Landsman | 264/25 |
| 4,355,318 | 10/1982 | Miyamchi | 346/76 |
| 4,386,360 | 5/1983 | Murayama et al. | 346/76 PH |
| 4,407,003 | 9/1983 | Fukui | 346/76 |
| 4,412,229 | 10/1983 | Wada et al. | 346/108 |
| 4,442,342 | 4/1984 | Yomeda | 219/216 |
| 4,510,507 | 4/1985 | Ishikawa et al. | 400/120 |

FOREIGN PATENT DOCUMENTS 56-82284  7/1981  Japan ................................. 400/120

*Primary Examiner*—E. A. Goldberg
*Assistant Examiner*—A. Evans
*Attorney, Agent, or Firm*—John S. Vale

[57] ABSTRACT

A closed loop thermal recording system and method are provided for recording a grey scale image on a transparency type of thermally sensitive recording medium in accordance with electronic image signals. The application of thermal energy to the medium is controlled, in part, by a feedback subsystem that optically monitors pixel area density while recording is in progress. The recording system includes a light reflective background member, located between a transparent recording layer of the medium and a thermal print head, for improving the accuracy and reliability of the optical monitoring process.

11 Claims, 12 Drawing Figures

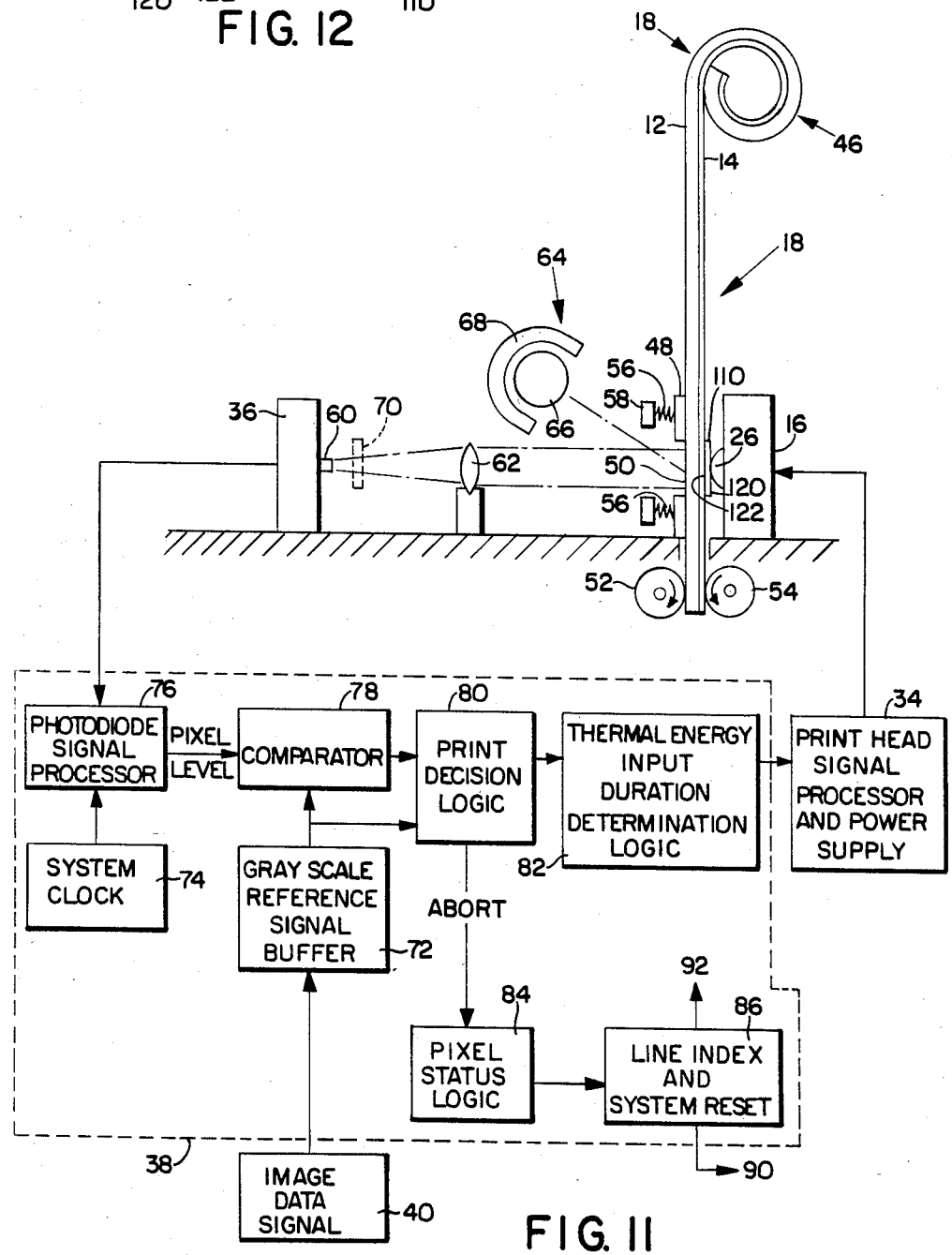

THERMAL RECORDING SYSTEM AND METHOD

RELATED APPLICATION

This application is related to commonly assigned application Ser. No. 685714 filed on even date herewith by Irving Erlichman, Algis Adomkaitis, and Richard L, Smith, and entitled "Thermal Recording Medium and Method".

BACKGROUND OF THE INVENTION

The present invention relates to the field of thermal recording or printing and, more specifically, to a thermally sensitive recording system and method for recording a grey scale or tonal image on a thermally sensitive recording medium of the transparency type.

Commonly assigned, copending application Ser. No. 676,502 filed on Nov. 29, 1984 by Irving Erlichman and entitled "Thermal Recording System and Method", discloses and claims a system and method for recording an image defined by electronic image signals on a thermally sensitive recording medium or paper comprising an opaque base or support layer and a thermally sensitive recording layer carried on one side of the base layer.

The image to be recorded is defined by a matrix array of minute pixel areas, each of which has a desired or target density specified by the electronic image signals. Variations in recorded pixel density is achieved by varying the size of a dot that is recorded in each of a plurality of selected pixel areas on the medium to provide a grey scale image in a manner that is analogous to half-tone lithographic printing.

Image quality, therefore, depends on precisely controlling the size of the recorded dots. To achieve precise control, the recording system is configured for closed loop operation wherein dot size or pixel density is monitored during recording with an electro-optical device such as a photodetector.

A dot is recorded by applying thermal energy to the recording medium which causes an invisible dye composition in the recording layer to turn dark or visible when the applied heat exceeds a threshold dye reaction temperature. Dot size increases with increased amounts of thermal energy applied to form a dot.

The opaque base layer of the medium serves as a contrasting background against which the recorded dots may be viewed by reflected light. In one embodiment of the recording system, a multi-element thermal print head is used to apply thermal energy to the back side of the paper for transmission through the base layer to the recording layer. This allows dot formation to be monitored with a photodetector array facing the recording layer on the front side of the paper where its view is not obstructed by the print head.

In accordance with the electronic image signals, an initial pulse of thermal energy is applied to selected pixel areas to form in each a dot having an initial size which is smaller than needed to achieve target or desired density. The photodetector array measures the density of the pixel areas having initial dots therein and feeds this information back to a control system which compares monitored density to desired density and provides comparison value signals. These comparison signals are used to trigger an additional application of thermal energy to further increase dot size. Again, pixel density is monitored and compared to desired density. The heating and monitoring cycle continues to progressively increase dot size until a predetermined density comparison value is achieved whereupon further application of thermal energy is terminated.

The key to controlling pixel density resides in the ability to accurately monitor the recorded dots with the photodetector array. By applying heat to the back side of the paper, the recorded information is not covered by the print head which facilitates monitoring. Also, the opaque base of the thermal paper provides a contrasting light reflective background which also facilitates obtaining accurate pixel density measurements with the photodetector array.

Recording an image on an opaque base medium provides a "hard copy" or print that is viewed by reflected light. However, there are applications in which it is highly desired to record an image on a transparency type thermally sensitive recording medium. For example, making a "hard copy" of a medical X-ray from electronically recorded image signals, or making overhead projection slides depicting graphic and/or text information for presentation at business meetings.

Transparency type thermally sensitive recording media are commercially available and generally comprise a transparent film or base layer having a transparent thermally sensitive recording layer coated on one side thereof.

Attempts have been made to record images on such a transparency type of medium utilizing the closed loop thermal recording system described above, but the results generally were inferior to those obtained with an opaque base paper.

The reason for this is attributable to erroneous pixel density readings from the photodetector. When the photodetector "looks at" a pixel area to monitor dot formation, it not only "sees" the recorded dot, but looking through the transparent area around the dot, it also sees whatever happens to be in the background of the opposite side of the medium. Unlike the opaque base paper which provides a uniform contrasting background against which the dots are viewed to measure pixel density, the transparent nature of this medium makes it very difficult to obtain consistent and reliable light level readings.

For example, the print head may consist of a linear array of individually addressable resistive heating elements, each having a size that is about the same as a corresponding pixel area on the medium. Suppose this head is pressed against the recording layer side of the transparent medium and a photodetector array is located on the opposite side in alignment with the head. The photodetector looks through the transparent base and recording layers and initially sees a corresponding ones of the heating elements which tend to be rather dark in tone. When heat is applied and a dark dot is formed, the photodetector views it against the dark heating element background which makes it very difficult, if not impossible, to obtain an accurate indication of dot size which in turn determines pixel density.

U.S. Pat. Nos. 3,577,137; 4,355,318; 4,407,003; 4,412,229; 4,442,342; and 4,064,205 are representative examples of prior art thermal printers which sense or calculate various printing parameters and use this information to improve control over the thermal recording process. However, none of these disclosures address the problem of how to avoid erroneous density readings when recording on a transparency type of recording medium.

Therefore it is an object of the present invention to provide a thermally sensitive recording system and method which is especially well suited for recording a grey scale image on a transparency type thermally sensitive recording medium.

It is yet another object to provide such a system and method which enhances the accuracy of monitoring pixel density while image recording is in progress.

Other objects of the invention will, in part, be obvious and will, in part, appear hereinafter.

SUMMARY OF THE INVENTION

The present invention provides a thermal recording system for recording an image represented by pixel areas of varied density on a transparency type thermally sensitive medium having a transparent support layer and a transparent recording layer wherein recorded dot size increases with increased amounts of thermal energy applied to form a dot.

The recording system is configured for closed loop operation and is responsive to image signals which define a desired density for each pixel area of the desired image.

System components include means for applying thermal energy, such as a thermal print head, to the medium; background providing means; means for optically monitoring pixel density; means for comparing monitored density to desired density; and means for operating the print head in accordance with the image signals and density comparison values.

The background providing means or member may take the form of a light reflective, fixed plate or movable flexible tape which is located between the print head and recording layer. Thermal energy is transmitted through the plate or tape which covers the print head elements and provides a contrasting light reflective background against which recorded dots may be viewed by reflected light.

The optical monitoring means receives light reflected by the background and is able to provide accurate readings of pixel density in that the background masks the print head elements which otherwise may contribute to erroneous density measurements.

The invention is also directed to a method of recording a grey scale image on a transparency type of thermally sensitive recording medium wherein the monitoring of pixel density is facilitated by the presence of the background member.

BRIEF DESCRIPTION OF THE DRAWINGS

For a fuller understanding of the nature and objects of the present invention, reference may be had to the following detailed description taken in connection with the accompanying drawings wherein:

FIG. 11 is a diagrammatic representation of a second recording system embodying the present invention which is similar in most respects to the system of FIG. 8 except that it includes a movable background tape; and FIG. 12 is a plan view of the tape extending between supply and take-up reel in operative relation to the thermal print head.

DESCRIPTION OF THE PREFERRED EMBODIMENT

Figure 1:
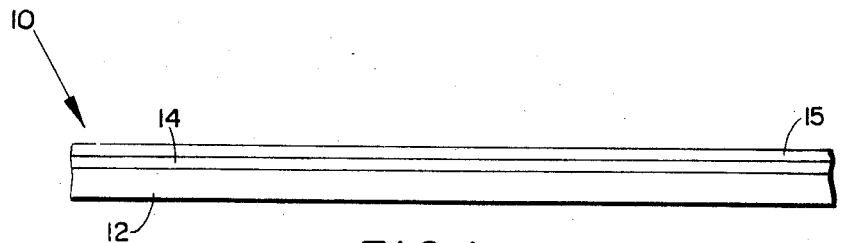
FIG. 1 is an elevational view of a thermally sensitive medium of the transparency type including a strippable background sheet.

The present invention provides a thermal recording system and method for recording a grey scale or tonal image on a conventional transparency type of thermally sensitive recording medium comprising a transparent support sheet and a thermally sensitive recording layer coated on one side of the support sheet. Two embodiments of the recording system, designated 32A and 32B, will be described later herein with reference to FIGS. 9-12. These systems feature components for providing a light reflective contrasting background against which recorded dots may be viewed by reflected light to facilitate monitoring dot formation as will become apparent later.

To provide the necessary background for understanding the problems involved in monitoring dot formation while recording on a transparent recording medium, it will be instructive to consider first an alternative approach to the problem wherein the contrasting background is incorporated into the recording medium rather than provided in the thermal recording system. Such a medium 10, which is the subject matter of commonly assigned copending application U.S. Ser. No. 685,714 filed on even date herewith, is shown in FIG. 1.

Medium 10 comprises a transparent base or support sheet or layer 12; a thermally sensitive image recording layer 14 adhered to, coated on, or otherwise supportively carried on one side or surface of support layer 12; and an opaque or translucent background sheet or layer 15 strippably or removably adhered, or otherwise coupled, to one of the support and recording layers 12 and 14. Background layer 15 is preferably at least coextensive with recording layer 14 and is arranged in overlying or covering relation to layer 14.

In FIG. 1, the background layer is in the form of a paper or plastic sheet 15 which is srippably adhered to the exterior surface or side of recording layer 14 by means of a pressure sensitive adhesive or the like (not shown) coated or otherwise carried on the facing surface of sheet 15. Alternatively, sheet 15 may be strippably coupled to the back side of support layer so that support layer 12 is between the recording layer 14 on the front side thereof and the background sheet 15.

Sheet 15 is configured to serve as a contrasting background against which dots or other information thermally recorded in layer 14 may be viewed by reflected light while recording is in progress. Thereafter, sheet 15 is adapted to be stripped off or removed to convert medium 10 to a more conventional transparency structure so that the recorded image may be projected or otherwise viewed by light transmitted through layers 12 and 14. Preferably, sheet 15 also serves as a thermally conductive buffer or diffuser through which thermal energy is transmitted and applied to layer 14 to record information therein. Generally, thermal energy would be applied to medium 10 with a thermal print head 16, diagrammatically shown in FIG. 7 which engages the background sheet 15.

Figure 2:
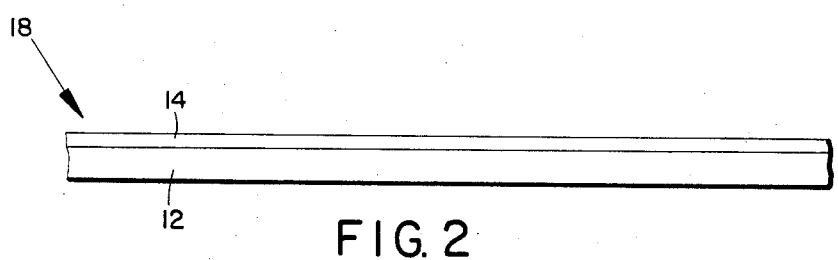
FIG. 2 is an elevational view of a conventional type of transparency recording medium.

The support and recording layers 12 may be provided, for incorporation into medium 10, in the form of conventional transparency type thermal recording medium 18, shown in FIG. 2, which includes support layer 12 and recording layer 14 coated thereon, but does not include the background layer 15.

Support layer 12 generally is in the form of a flexible, transparent, colorless or lightly tinted, plastic film or sheet having a thickness in the range of 0.002 to 0.008 inches. The recording layer may be coated directly on one side of layer 12, or layer 12 may include one or more thin transparent layers thereon (not shown) to facilitate coating layer 14 or improving its adherence to layer 12.

Recording layer 14 is a transparent colorless chemical composition having heat sensitive dyes therein which are colorless or invisible at temperatures below a minimum or threshold dye conversion temperature. Upon application of thermal energy to layer 14 which exceeds the threshold temperature, generally in the range of 140° to 300° F., the dyes irreversibly turn dark or opaque and become visible. Typically, layer 14 is of the chelate or leuco type. One representative example of a commercially available transparency medium 18 that has been incorporated in a medium 10 embodying the present invention is a product designated Infrared Projection Transparency—Type TR485 marketed by Labelon Corp., Canandaigua, N.Y.

As noted earlier the background layer or sheet 15 is preferably an opaque or translucent paper or plastic sheet having an adhesive layer thereon for temporarily securing sheet 15 to one of the transparent layers 12 and 14, preferably recording layer 14 as shown in FIG. 1. It serves as contrasting background against which at least recorded image components may be viewed by reflected light while image recording is in progress. One representative example of a background sheet material that has been used in conjunction with Labelon to form the medium 10 embodying the present invention is a vinyl or polyester electrical tape material which comprises a yellow plastic film approximately 0.001 inches thick having a pressure sensitive adhesive layer, approximately 0.001 inches thick, coated on one side of the film. Such tape material is commercially available from Minnesota Mining Company and comes in a variety of colors including white which also would be a good choice for providing contrast for dark tone recorded dots. Such a tape material is laid on layer 14, in covering relation thereto, and releasably secured by applying light pressure to insure good contact between the adhesive layer on the tape material and layer 14. After recording, the tape material is easily stripped away from layer 14 manually.

A grey scale image to be recorded in layer 14 is formed by utilizing print head 16 to record dots of various size in selected pixel areas to provide varied density pixels in accordance with electronic image signals defining the desired image. The construction of a typical print head 16 and an explanation of how a dot is formed in layer 14 now will be provided with reference to FIGS. 3-7.

The thermal print head 16 typically comprises an array of individually addressable, electrically resistive print elements which are energized by the application of voltage to produce heat as current flows therethrough. The heat produced by an element is applied to a localized pixel area in layer 14 aligned with the energized element to activate the dye and produce a visible dot therein.

The print head 16 may include a horizontally extending array of elements that spans the width of the medium for printing a line at a time, or it may include a smaller matrix of elements and be mounted for horizontal movement back and forth across the medium to print information serially.

Figure 3:
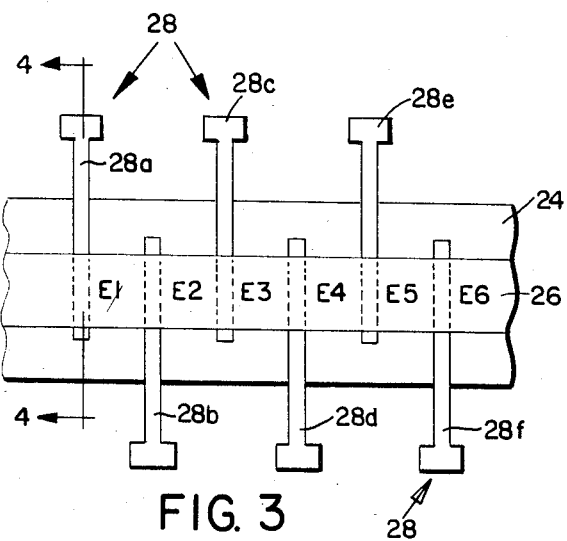
FIG. 3 is a plan view of a portion of a thermal print head showing a plurality of heating elements.
Figure 4:
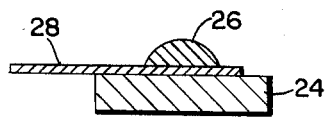
FIG. 4 is a cross-sectional view of the heating element structure taken along lines 4—4 of FIG. 3.

One type of print head 16 commonly employed in thermal line printers is diagrammatically shown in FIGS. 3 and 4. It comprises an elongated rectangular substrate 24 made of ceramic, glass or the like, a continuous elongated heater strip 26, extending horizontally along the length of substrate 24, formed of a thin or thick film electrically resistive material, and a plurality of equally spaced, interdigitated, metal conductors or leads 28 which make electrical contact to the underside of resistant strip 26. As best shown in FIG. 4, the lateral cross section of strip 26 generally is convex making it thicker in the center than at the lateral edges.

The electrical leads 28 serve to divide the continuous strip 26 into a serial array of individually addressable thermal heating elements E. When an energizing voltage, typically in the range of 12 to 18 volts, is applied between leads 28a and 28b, it causes a current to flow through that rectangular portion of strip 26 therebetween designated element E1. The current flow through the resistive material of element E1 generates thermal energy or heat which impinges upon the pixel area of layer 14 aligned with element E1 causing the dye therein to react and change color once the threshold temperature is exceeded. The next element E2 in the array may be energized by applying voltage between its corresponding bordering leads 28b and 28c. Likewise, the next successive element E3 may be energized by impressing voltage between leads 28c and 28d, . . . etc.

Any individual element E in the linear array may be energized simply by applying voltage between its corresponding bordering leads 28. The leads 28 generally are connected to a matrix switching system (not shown) which facilitates the application of energizing voltage to selected leads 28. Through the switching system, any or all of the elements E may be energized simultaneously in response to appropriate data input signals.

The dot formation process may be more clearly understood by first considering how dots are formed in a non-grey scale application, such as a dot matrix printing of alphanumeric characters on a transparency medium 18 which does not include a background layer 15.

Figure 5:
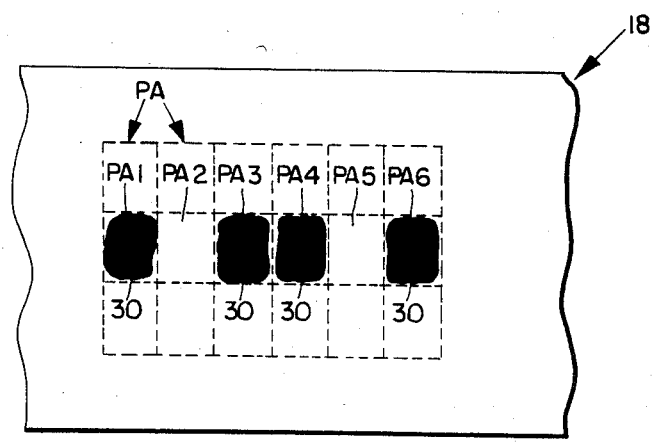
FIG. 5 is a plan view of a portion of the recording medium showing several recorded dots located within corresponding pixel areas.

The performance goal in dot matrix printing is to make each of the dots or marks of uniform size and density. FIG. 5 diagrammatically shows a portion of a thermal medium 18 divided by imaginary dotted lines into a column and row matrix of rectangular or box-like pixel areas PA. Each pixel area PA is of uniform size.

Assume for the moment that the head 16 illustrated in FIG. 3 is pressed against layer 14 of medium 18 so that elements E1-E6 are in overlying registration and in contact with corresponding ones of the pixel areas in the middle row PA1-PA6.

By applying voltage to the appropriate leads 28 to energize elements E1, E3 E4 and E6 for a selected period of time, dots or marks 30 are formed in the corresponding pixel areas. The voltage generally is applied in the form of a pulse having a duration in the range of 2 to 10 milliseconds depending on the sensitivity of the particular thermal medium used. The dots 30 more or less substantially fill the corresponding pixel areas and have a more rectangular than round shape in that they tend to replicate the individual heating elements E which are rectangular. It should be understood that the term dot when used herein means a mark of any kind in a pixel area within which the dye has been activated such that it is visible. Dots may be of any shape including circular, rectangular, or having uneven or jagged edges so as not to be classifyable in terms of commonly used shape designations.

Upon observing the formation of a dot 30, one finds that it tends to progressively increase in size or area over the course of its formation during which thermal energy is applied to the corresponding pixel area by the heated element E.

Figure 6:
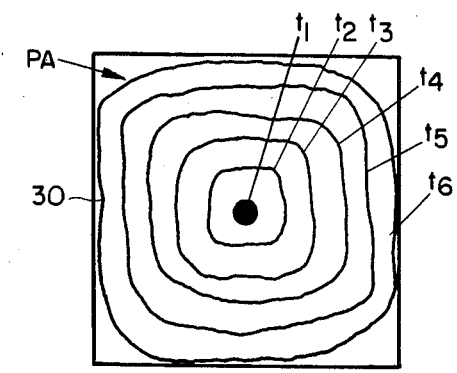
FIG. 6 is an enlarged plan view of a portion of the recording medium showing a progressive increase in dot size.

As is diagrammatically shown in FIG. 6, which is a greatly enlarged view of a pixel area PA, the dot 30 generally initially appears as a very small (compared to the total area of PA) mark in the center portion of PA at a time T1 following the energization of the corresponding print head element E at time T0. During the interval between T0, when voltage is applied and T1 (typically in the range of 0.5 to 2 milliseconds) the element E heats up sufficiently to exceed the threshold temperature at which the dye reacts by turning dark and the small initial dot 30 appears. In response to continued thermal energy exposure, the dot or mark 30 grows in area and progressively gets larger indicated by the irregularly shaped dotted rings which are meant to diagrammatically show the outer edges of the expanding dot 30 at subsequent times T2-T5. At T5, the element E is deenergized.

It is not unusual, however, for the dot 30 to "grow" slightly larger, as indicated by the outermost ring indicating dot size at T6, due to residual heat attributable to the thermal inertia of medium 18 and the heated element. The residual heat causes a very short interval of continued thermal energy input after deenergization even though the print elements are designed to cool very quickly after the voltage is turned off. At T6, the thermal energy input has dropped off to the point where the temperature in the pixel area PA is below threshold and no further dot growth occurs. If the element E is energized beyond T5, it is possible for the dot 30 to grow slightly beyond the imaginary bounds of PA. This effect is commonly referred to as "blooming".

As noted earlier, in dot matrix printing the goal is to make all of the dots 30 the same full size which fills or substantially fills its corresponding pixel area PA. If, however, there are variations in the voltage applied to different elements E, or if there are variations in the electrical resistivity among the different elements in the linear array responding to a constant applied voltage, there will be variations in the total thermal output of various elements E which will result in variations in the size or areas of their resultant dots 30. Also, there may be variations in the sensitivity of layer 14 which may cause variations in the resultant dot size for a given amount of thermal energy input.

The above description of dot growth assumes continuous energization of the heating element E which is turned on at time T0 and subsequently turned off at T5. Once the threshold temperature is exceeded, the dot progressively grows in response to continued thermal energy input which may be expressed in terms of electrical power input to the heating element E in watts (IE) integrated over the time period T0-T5 during which power is applied. Thus, the size or area of dot 30 increases with increases in the cummulative or total amount of thermal energy applied to form the dot.

It has also been observed that a full sized dot 30 may be formed in steps by applying successive, short duration, pulses of thermal energy to layer 14. With reference to FIG. 6, if the supply voltage is turned off at T1 just as the small dot 30 in the center becomes visible, the dot will grow slightly larger due to residual heat and thermal inertia. But when the temperature drops below threshold, dye conversion stops and dot growth is terminated.

Dot growth may be restarted by subsequently turning on the element E. Dye conversion beyond the edges of the existing dot doesn't start immediately because there is a delay until the heat input pushes the temperature up over threshold. But, once the threshold temperature is exceeded, dye activation is initiated once again and the dot 30 progressively increases in area until the process is terminated by turning off the supply voltage to element E. This process may be repeated a number of times until the dot reaches its full size substantially filling the pixel area PA. Thus, dot size or area may be progressively increased in steps by a series of separate inputs of thermal energy.

The present invention is directed to producing grey scale images on a thermally sensitive transparent medium by producing dots of various size thereon in a controlled manner in much the same way that half-tone lithography employs variations in dot size to represent pixel densities ranging from light to dark.

If a pixel area PA has no dot form therein, incident light is transmitted through the entire clear pixel area and this pixel is perceived as being of the lowest density or lightest tone on the grey scale. A small dot 30 in the pixel area PA, such as the one shown on FIG. 6, absorbs some of the incident light and the pixel is perceived as a light grey having a density of approximately 3 to 10%. The full sized dots 30 shown on FIG. 5, which substantially fill the corresponding pixel areas PA minimize transmitted light which result in these pixels being perceived as dark or high density pixels having a density in the range of approximately 90 to 100%.

As we have seen earlier, dot size and therefore the preceived density of a pixel, comprising a pixel area PA having either no dot 30 therein or a dot 30 having a size somewhere a minimum and maximum, is a function of the amount of thermal energy applied to the layer 14 of the pixel area. If the power input to the element E is known or can be accurately calculated, then dot size or pixel density can be regarded as a function of the time period during which heat is applied. Theoretically, it is possible to vary dot size or pixel density simply by varying the duration of the thermal energy input. For small dots or low pixel density, the element E would be energized for a short time. For larger dots or higher density pixels, the heat application period would be increased proportionately.

In practice, however, this concept does not produce satisfactory results in that the actual amount of thermal energy transferred to layer 14 does not correlate well with heat application time. Generally, this is caused by variations in the electrical characteristics of the individual elements E, variations in thermal inertia or heat buildup in the print head 16 caused by energizing different combinations of elements E simultaneously, and possible variations in input voltage to the elements E forming the array. Achieving control over dot size is also made more difficult because there may be variations in the thermal sensitivity of layer 14 at different locations thereon, or variations in the amount of pressure contact established between the head elements and the medium.

Unlike prior art systems and methods that attempt to achieve control of dot size (and therefore pixel density) by sensing process parameters such as print head temperature, input voltage, or head scanning rates and make corrective adjustments accordingly via a feedback loop, the thermal recording medium embodying the present invention looks not to input parameters to achieve control, but rather to the results of the process, namely the dot itself.

Broadly speaking, closed loop control is achieved by sensing the dot as it is being formed, evaluating whether or not the dot is large enough by comparing it to a reference indicative of desired pixel density, and, if necessary, applying additional thermal energy input to further increase dot size until a predetermined comparison value is achieved.

Figure 7:
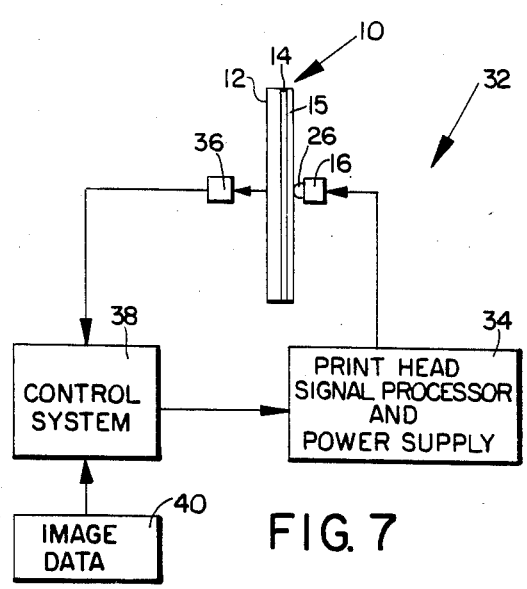
FIG. 7 is a diagrammatic representation of a closed loop thermal recording system.

A thermal recording system 32, for recording a grey scale image on the transparency medium 10 embodying the present invention, is shown in block diagram form in FIG. 7. Its components include a resistive type thermal print head 16 comprising a linear array of individually addressable elements E; a print head signal processor and power supply 34 operable to selectively energize each of the elements E in the array; a linear array electro-optical or photocell detector 36 directed at the line of pixel areas on medium 10 which are registered with the print head elements for optically sensing pixel density by measuring brightness or the level of reflected light; and a control system 38. The control system 38 includes means for receiving electronic image signals 40 which define a target or desired density for each of the pixels that collectively define an electronically recorded image which is to be printed or recorded on medium 10. Typically, these are digital signals that are provided from a computer or a digital data storage device. Additionally, system 38 may be equipped to receive analog video signals and convert them to digital form internally.

In system 32, the print head 16 is located on the backside of medium 10, pressing against the background sheet 15, and the optical monitoring or sensing means, in the form of the photocell array 36, is located on the opposite side of medium 10 where it has an unobstructed field of view through the transparent base layer 12 of that portion of layer 14 registered with the print head 16 for sensing dot formation from the front side of medium 10.

When a heating element in print head 16 is energized, thermal energy flow through background sheet 15 and impinges layer 14 from the backside to form a dot therein by dye activation.

There is one disadvantage to heating medium 10 from the backside through background sheet 15. Sheet 15, being formed of paper or plastic, does not have the highest degree of thermal conductivity. Therefore, it takes slightly longer for the temperature to build up to the threshold value than if the thermal energy were applied directly to layer 14. This, of course, slows down the recording process slightly, But, this inconvenience is overshadowed by two major advantages.

First, the opaque or translucent background sheet 15 blocks the photodetector's view of the print head elements on the backside of medium 10 which would be visible in the background through transparent layers 12 and 14 if sheet 15 were not in place. Generally, the print head structure has a dark tone or does not provide a high degree of contrast with respect to the tone of a recorded dot. Without the masking effect of sheet 15 the recorded dot and the print element structure in the background tend to blend together thus causing erroneous pixel density readings. In addition to masking the print head structure, the color and tone of sheet 15 is chosen to provide a contrasting light reflective background against which recorded dots are viewed by photodetector 36 while image recording is in progress thus facilitating monitoring and increasing the accuracy and uniformity of the photodetector measurements.

Secondly, it has been discovered that when thermal energy is transmitted to layer 14 through sheet 15, the density and shape of the recorded dots tend to be more uniform than if thermal energy is applied directly to layer 14 by locating the heating elements in contact therewith. Also, it has been observed that directly contacting layer 14 with heated elements sometimes causes localized distortion in or even slight melting of layer 14 which degrades the quality of the recorded dots. This problem is not evident when the intervening sheet 15 is employed. Although the mechanisms causing this improvement are not well understood at this time, one may speculate that the background sheet acts as a buffer or diffuser that beneficially influences the distribution of the thermal energy as it traverses sheet 15 to produce more uniform dot density.

The control system 38 preferably includes a microprocessor, memory, and suitable I/O devices to process the image data input signals and light level signals received from photodetector 36, and in response to these signals control the operation of the print head signal processor power supply 34 so as to regulate the operation of print head 16.

Recording system 32 is a closed loop system which uses feedback to achieve precise control over pixel density. It establishes in memory a reference grey scale signal for each pixel in the current line to be recorded indicative of a target or desired density for that pixel. Based on the reference signals, it consults a lookup table and selects an appropriate pulse duration time for an initial application of thermal energy to each selected pixel area PA that is calculated to produce an initial dot that is smaller than necessary to achieve target density.

For example, the initial pulse duration may be set to produce a dot that is approximately 75% of the size necessary to achieve the target density. Control system 38 then actuates the signal processor and power supply 34 which energizes each of the elements E corresponding to pixel areas in the row in which dots are to be recorded for its selected initial pulse duration. In response to this input, the selected elements E in print head 16 are heated accordingly to form the initial dots.

Following deenergization of the heating elements E and an intentionally provided short delay to be sure that any additional dot growth attributable to heat buildup and thermal inertia is complete, the photodetector array 36 is actuated to provide a light level reading for each of the pixel areas in the row. Ambient light impinges the front side of medium 10 and is reflected by background sheet 15 to the individual photocells in array 36. If no dot or a small initial dot has been printed in a given pixel area, a large percentage of incident light will be reflected from the pixel area and produce a relatively high light level reading. Larger initial dots will absorb more of the incident light and therefore the light level readings from these pixel areas will be lower.

The light level readings are correlated to grey scale density. Thus, the photocell detector 36 provides signals to the control system 38 that are indicative of the actual perceived density of each pixel in the line.

Control system 38 includes means for comparing the photocell readings with the reference signals that indicate the target or desired density. Because the initial pulse duration was selected to form dots smaller than necessary to achieve target density, in general, the observed density should be lower than the target density. However, because of variations in the heating elements, or supply voltage or sensitivity of the recording layer, some of the dots may actually be larger than expected and produce an observed density that matches or is very close to target density. In these cases, control system 38 will note that the initial dot is large enough to satisfy the density requirement and will automatically preclude further application of thermal energy which would further increase dot size.

In most cases however, the initially recorded dot will be undersized and the comparison will provide a signal indicating further thermal energy input is required to make the dot grow larger. Control system 38 then determines the duration of the next application of thermal energy and operates the power supply 34 once again to energize those elements E corresponding to pixel areas that require additional dot growth. This next application of thermal energy is of shorter duration than the initial pulse in that now the goal is to increase dot size in small steps as it approaches its target size.

After this next application, and short delay to insure dot growth has terminated, the photocell detector 36 once again reads pixel density and control system 38 compares the readings to the reference signals to determine which of the pixels have reached a predetermined value of comparison, and are therefore at or very close to target density, and those other pixels that need yet another round of thermal input to achieve greater size.

In this manner, the printing cycle continues until all of the pixels in the row have achieved target density at which point control system 38 aborts printing of the current line and initiates a new printing cycle in preparation for recording the next line which includes advancing or indexing medium 10 to the next line position.

After all of the lines defining the image have been recorded, medium 10 is removed from system 32 and the background sheet 15 is manually stripped away from recording layer 14, thereby allowing the recorded image to be viewed or projected by light transmitted through layers 12 and 14.

The same feedback control concept may be used with thermal print heads other than the resistive type. For example, the source for applying thermal energy may be in the form of a laser diode array or may be a single laser that is scanned over recording medium 10 to effect recording. Laser output could be applied to the back side of medium 10 so that it impinges background sheet 15. Or the laser may be located on the front side of medium adjacent photodetector 36 and transmit energy through support layer 12 to recording layer 14. Alternatively, medium 10 could be modified so that background sheet 15 is strippably attached to the support layer 12 instead of layer 14 and the modified medium 10 would be turned around so that layer 14 faces the laser which transmits energy directly on layer 14. In all these various embodiments, the background layer 15 still serves its primary function of providing a contrasting light reflective background against which information recorded in layer 14 may be viewed by reflected light to facilitate monitoring with photodetector 36.

Further details of the thermal recording system 32 employing a resistive type print head 16 will now be described with reference to FIG. 8. In the illustrated embodiment, system 32 is configured for line printing.

The thermal recording medium 10 is fed vertically from a supported supply roll 46 down between the horizontally disposed printhead 16 and an oppositely disposed spring loaded pressure plate 48 having a central opening therein in the form of a horizontally extending slot 50, an then between a pair of stepper motor driven paper drive or indexing rollers 52 and 54 located below print head 16. Collectively these components serve as means for supporting a thermally sensitive medium in position for recording.

The print head 16 is of the electrically resistive heating element type previously described and has the convex heater strip 26 in engagement with the backside of the strippably adhered background sheet 15. The pressure plate 48 extends across the width of medium 10 and is disposed so that slot 50 is in registration with the heater strip 26 thereby providing an observation window for monitoring dot formation on the front side of medium 10. Plate 48 bears against layer 12 on the front side of medium 10 and is urged rearwardly by a pair of compressed springs 56 mounted on fixed supports suggested at 58 for pressing that portion of medium 10 against head 16 to maintain pressure contact between strip 26 and the back side of background sheet 15.

There are many commercially available line printing thermal heads that may be modified for use in system 32 by providing circuitry to make the elements E individually addressible. Typical representative examples include types KC3008, KC2408, KC2017 and KH1502 marketed by Rohm Corp., Irvine, CA. Within this group of heads, heating element density ranges from approximately 150 to 300 elements per inch.

If one were to use a head 16 that is designed to produce 200 dots per inch, then a maximum size dot 30, that substantially fills a pixel area PA, would measure approximately 0.005 inches across its width. A minimum size dot 30 formed in a pixel area PA to define a fairly low density pixel, say in a range of 5 to 20%, would measure approximately 0.001 inches across its width. However, dot size alone does not determine perceived density, especially at the smaller sizes. This is because the small dots that are initially formed in layer 14 upon its reaching its threshold temperatures tend to be less dense, or dark, than a larger size dot.

Spaced forwardly of pressure plate 48, in registration with the observation window defined by slot 50, is the photocell detector or sensor 36 for optically monitoring the density of each pixel area in the current line to be recorded.

Preferably, detector 36 comprises a linear array of photodiodes (designated 60 in FIG. 8) or the like which are equal in number and spacing to the heating elements E on head 16 for receiving reflected light from corresponding ones of the pixel areas PA. However, if the size or spacing of the photodiodes 60 differs from those of the heating elements E, it is preferable to provide a compensating optical component between the line of photodiodes 60 and the observation window 50 to maximize efficiency of the dot monitoring process.

One type of commercially available detector 36 that is suitable for use in system 32 is the series G, image sensor marketed by Reticon Corp. The photodiode array has a pitch of 1000 diodes per inch. If it is used in conjunction with a print head 16 that has 200 elements per inch, this means that a pixel area PA is 5 times larger than the photodiode area so the photodiode will not "see" the entire pixel area PA. This condition may be corrected by locating an objective lens 62 in the optical path which serves to provide a focused image of the larger pixel area on the smaller size photodiode.

While it is possible to sense the level of ambient light reflected from the pixel areas registered with slot 50, it is preferable to provide supplemental illumination for this area in the interest of improving efficiency and obtaining consistent and reliable density readings.

In the illustrated embodiment, system 32 includes an illumination source 64, in the form of a lamp 66 and associated reflector 68, positioned in front of and above pressure plate 48 for directing light onto the strip of medium 10 registered in the observation window 50. Inasmuch as photodiodes tend to be very sensitive to infrared wavelengths, it is preferable to use a lamp 66, such as a fluorescent lamp, that does not generate much infrared radiation to prevent overloading the photodiodes with energy outside of the visible light band that carries pixel density information. Alternatively, if the type of lamp 66 selected for use does include a significant infrared component in its spectral output, an optional infrared blocking filter 70 (shown in dotted lines) may be located in front of the photodiodes 60 to minimize erroneous readings.

Figure 8:
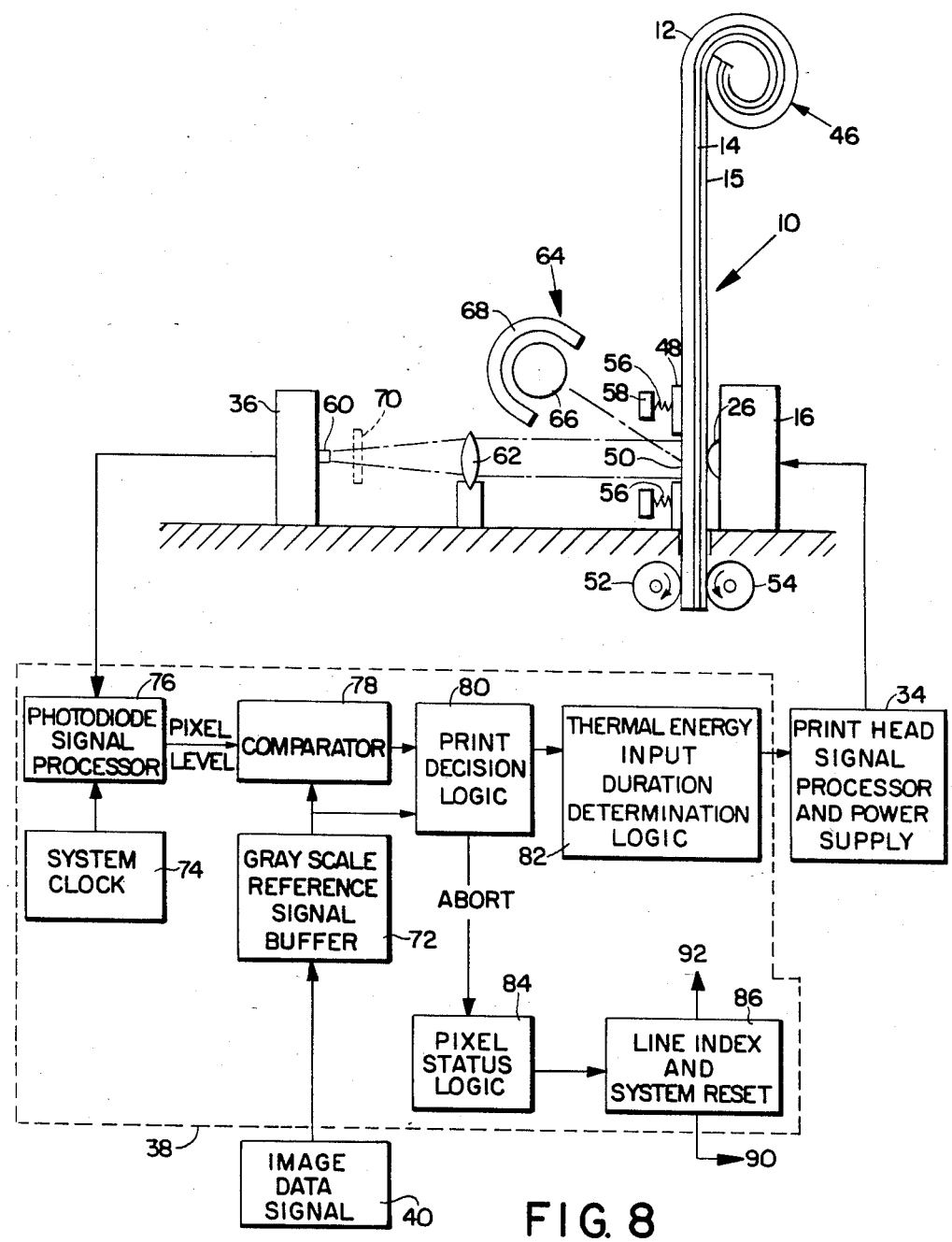
FIG. 8 is a more detailed diagrammatic representation of the system shown in FIG. 7.

In FIG. 8, functional components of the control system 38 are shown in block diagram form within the bounds of a dotted rectangle 38.

In preparation for recording a monochromatic image on medium 10, electronic image data input signals 40 defining the pixel by pixel density of the image matrix are fed into means for receiving these signals, such as a grey scale reference signal buffer memory 72. Preferably, the image signals are in digital form provided from an image processing computer or digital data storage device such as a disk or tape drive. If the electronic image signals were originally recorded in analog form from a video source, it is preferable that they undergo analog to digital conversion, in a manner that is well known in the art before transmission to buffer 72. Alternatively, as noted earlier, control system 32 may optionally include an analog to digital signal conversion subsystem for receiving analog video signals directly and converting them to digital form within control system 38. Preferably, buffer 72 is a full frame image buffer for storing the entire image, but it also may be configured to receive portions of the image signals sequentially and for this purpose buffer 72 may comprise a smaller memory storage device for holding only one or two lines of the image.

Thus, control system 38 includes means for receiving electronic image signals which it utilizes as grey scale reference signals that define desired or target pixel densities for comparison with observed density signals provided from the optical monitoring photodiode detector 36 in the feedback loop.

The operation of control system 38 is coordinated with reference to a system clock 74 which among other things sets the timing for serially reading the light level or pixel density signals from each of the photodiodes 60 in the linear array. Light level signals from detector 36 are fed into a photodiode signal processor 76 which converts analog signals provided from detector 36 to digital form. Alternatively, this A/D conversion may take place in a subsystem incorporated into detector 36.

Density signals from processor 76 along with reference signals from buffer 72 are fed into a signal comparator 78 which provides signals indicative of the comparison to a print decision logic system 80. Based on the comparison information, system 80 provides either a print command signal or an abort signal for each pixel in the current line. Print command signals are fed to a thermal input duration determining logic system 82, and abort signals are fed to a pixel status logic system 84.

Upon receiving a print command, system 82 utilizes look-up tables therein to set the time period for energizing each of the heating elements that are to be activated and feeds this information to the print head signal processor and power supply 34 which actuates the selected heating elements in accordance with these instructions.

The abort signals allow system 84 to keep track of which pixels have been recorded and those that yet need additional thermal input for completion. When abort signals have been received for every pixel in the current line being printed, system 84 provides an output signal to a line index and system reset system 86.

System 86 provides a first output signal designated 90 which actuates a stepper motor (not shown) for driving the feed rollers 52 and 54 to advance medium 10 one line increment in preparation for recording the next image line. Additionally, system 86 puts out a reset signal, designated 92, for resetting components of control system 38 in preparation for recording the next line.

In the elongated array of photodiodes 60, most likely there will be some variations in output or sensitivity among the individual photodiodes 60. However, during factory calibration variations may be noted and correction factors may be easily applied in the form of a calibration software program to compensate for such variations. Likewise, variations in the thermal output characteristics of each of the heating elements E in print head 16 may be determined by calibration measurement and corrected with a compensating software program that automatically adjusts energization times of the individual heating elements to produce uniform thermal outputs across the array.

In the operation of recording system 32, a thermal recording cycle is initiated by actuation of the print decision logic system 80. Actuation may be accomplished by the operator manually actuating a start button (not shown).

In response to actuating system 80, grey scale reference signals indicating the desired or target densities of all of the pixels in the first line are sent from buffer 72 to system 80. System 80 evaluates this information and for those pixel areas in which no dot is to be recorded, so as to represent the lightest tone in the grey scale, abort signals are sent to the pixel status logic system 84. Print command signals for those pixel areas in which a dot is to be printed are transmitted from system 80 to system 82. System 82, using the look-up tables, provides initial thermal input duration signals indicative of the time period that each heating element E is to be energized to print an initial dot in its corresponding pixel area PA.

To minimize the length of the line recording cycle, it is preferable that the initial dot be smaller than the final dot size but large enough so that the number of successive thermal energy applications needed to to make a dot of the required size is not excessive.

For example, system 82 will provide initial thermal input time signals to form an initial dot that is approximately 75%–85% of the final or desired dot size. This means, that each initial dot will be smaller than the pixel area in which it is formed. Even if the reference signals indicate that a high density dot which substantially fills the pixel area is to be recorded, initially a smaller dot will be formed which provides an optically detectable input for the feedback loop utilized to achieve precise control over dot size or pixel density.

The initial duration signals are fed from system 82 to the print head signal processor and power supply 34 which is capable of addressing each of the elements E in print head 16 and applying supply voltage thereto for the initial times indicated.

The energized heating elements E apply thermal energy to the backside of medium 10 and cause the recording of the initial dots which are now visible in the observation window defined by slot 50. The line of dots are illuminated by light source 64 and the density of each pixel area PA is read by the photodiode detector 36. These signals are transmitted to processor 76 which provides the pixel density level signal indication to comparator 78 for comparing the initial pixel density with the target density signals provided from reference signal buffer 72.

Correlating the photodiode output signals to the refelective characteristics of any particular type of medium 10 may be done by taking test readings on a blank medium 10 to establish a reference signal level for highest reflectivity which is indicative of the lowest density or brightest pixel in the grey scale. As a preferable alternative, the setting of the reference level may be built into the recording cycle by having system 32 automatically take a photocell reading of the pixel areas PA registered in the observation window prior to energizing the print head to record the initial dots therein.

As noted earlier, additional dot growth may occur subsequent to deenergization of a heating element E in print head 16 due to heat build up in the head structure and thermal inertia. Therefore, it is preferable to delay the photodetector reading for a short time after the heating elements are deenergized so that any additional growth will be included in this reading.

The pixel density readings are compared to the reference signals by comparator 78 which supplies signals indicative of the difference therebetween to the print decision logic system 80. Because the initial dot size was calculated to be smaller than the final dot size the vast majority of the differential signals will indicate that additional thermal input is necessary to make each of the dots slightly larger. However, because of the variability of thermal recording parameters, at least some of the dots may have reached desired size even though the initial thermal input was intended to create a dot of only 75%–85% of desired size. For these pixels, system 80 provides abort signals to the pixel status system 84 and terminate any further thermal input thereto during the next portion of the recording cycle.

For those pixels that have not yet reached the target or desired density, system 80 will issue print commands to system 82 which will then provide signals indicative of the time needed to produce additional dot growth. Because the objective is now to make the dots only a little bit larger than initial size, the duration of print element energization will be shorter than the times used to record the larger initial dots.

Thermal input pulse duration times will, of course, depend on the thermal sensitivity characteristics of the particular medium employed. If a particular medium 10 requires a 10 millisecond pulse to form a full size high density dot when the energy is applied through background layer 15, the initial pulse typically would be in the range of 6 to 8 milliseconds to form the initial dot. One or more subsequent pulses to induce further growth toward target size typically would be in the range of 4 to 8 milliseconds, remembering that at least a portion of the subsequent pulse duration only serves to bring the temperature up to the threshold value.

The print head elements E are energized and, following a short delay for thermal stabilization, the photodiodes 60 once again read pixel density and feed the signals back to the comparator 78 to test these readings against the reference levels. Again, the system 80 recycles in this manner with abort signals being provided for those dots that have reached their target size and print commands being provided for pixel areas that need additional thermal input to bring their density up to target level. Once the pixel status system 84 indicates that all of the pixels in the line are at target density, system 84 triggers the line index and reset system 86 which causes the paper to be moved in one line increment and various control components to be reset in preparation for recording the next image line.

Thus, a typical line recording cycle comprises the steps of sensing the reflected light level of the pixel areas registered in the observation window to establish an initial reference level indicative of the lowest density pixel; in accordance with the grey scale reference signals, energizing the print head elements to record initial dots in selected pixel areas which are smaller than necessary to achieve target density; following a delay to allow for additional dot growth due to heat build up and thermal inertia, sensing the reflected light level of line of pixel areas to measure or observe the density of the initial dots; comparing the observed density with the target density; and based on this comparison initiating the application of additional thermal energy to those pixel areas which require larger dots to bring them up to target density and also terminating further input of thermal energy to those pixel areas where the comparison indicates hat a predetermined comparison value has been achieved.

If, for example, the monitored density is very close to the target density, say in the range of 95 to 98% of target, it may be very difficult to tailor the next round of thermal input to that pixel area to achieve the very small amount of additional growth needed to reach target density. Therefore, rather than risk making the dot larger than needed to achieve an exact match with target density, it would be preferable to abort any further application of thermal energy to that particular pixel area.

In the above described process, the desired dot in each pixel area is formed in steps. First an initial dot is made and it is measured for comparison against the grey scale reference signal then, if necessary, one or more additional short pulses of thermal energy are sequentially applied to that pixel area to bring it up to its target density. Through the use of feedback, dot size can be controlled to a much higher degree than if this system were to simply operate in an open loop manner with dot size being correlated to the duration of thermal energy input for each pixel area.

As an alternative to the stepwise mode of operation, system 32 may be configured for continuous power application with feedback monitoring of dot formation. In this case, the heating elements E corresponding to the pixel areas PA in the line that are to have dots recorded therein in accordance with the grey scale reference signals are all turned on simultaneously. As the dots appear and continue to grow, pixel density is continuously monitored and compared to the reference levels. When the predetermined comparison value is achieved for a given pixel area, the system automatically deenergizes its corresponding heating element. While this mode of operation may shorten the recording cycle somewhat compared to the stepwise dot formation cycle, the degree of control over dot size may not be as great because additional dot growth due to heat build up and thermal inertia is not accounted for in the control provided by the feedback loop. A certain amount of additional growth may be anticipated and the heating elements could be turned off at a lower predetermined value of comparison to provide some compensation for this additional dot growth. However, it would seem that the higher degree of accuracy provided by the stepwise method may be preferably unless there is an urgent need to reduce recording cycle time.

While the illustrated embodiment of recording system 32 is portrayed as line recording system, it is within the scope of the invention to modify this system for scanning mode operation wherein a print head and accompanying photodector that are narrower than a full line aremoved back and forth across the width of a paper to effect image recording. Also, the print head and photodector may be configured to record on more than one line or to record the entire image so as to minimize or eliminate the need for relative movement between the components of the recording system and the thermally sensitive recording medium.

After the last image line has been recorded, medium 10 is advanced by actuating rollers 52 and 54 so that the portion of medium 10 having the full image thereon is located beyond the rollers where it is severed from roll 46. The background sheet 15 now conveniently allows the operator to visually inspect the recorded image by reflective light in that while sheet 15 remains in place, their recorded image has the appearance of a reflection print. Thereafter, sheet 15 is manually stripped away from layer 14 thereby producing a conventional transparency that is ready for image projection or viewing the recorded image by transmitting light through the recording medium.

While the background layer 15 has been illustrated as a separate paper or plastic sheet that is adhesively bonded to one of the layers 12 and 14, alternatively medium 10 could be modified by providing layer 15 in the form of an opaque coating which is lightly adhered to one of layers 12 and 14 and has sufficient tear resistance to be manually strippable following image recording.

As an alternative to incorporating means for providing a contrasting background, such as layer 15, into a thermally sensitive recording medium, the background providing means may be incorporated into a thermal recording system for recording a grey scale image on a conventional transparency thermal recording medium such as the previously described medium (see FIG. 2) comprising the transparent support and recording layers 12 and 14.

Two such thermal recording systems 32a and 32b, embodying the present invention, now will be described with reference to FIGS. 9-12 wherein components that are in common with the previously described system 32 carry the same numerical designations.

Figure 10:
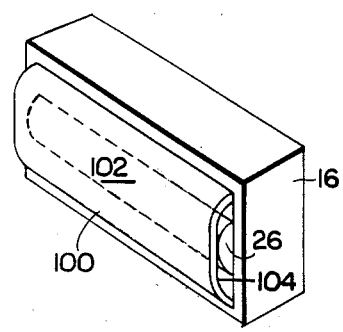
FIG. 10 is a perspective view of the background plate shown mounted on a thermal print head.
Figure 9:
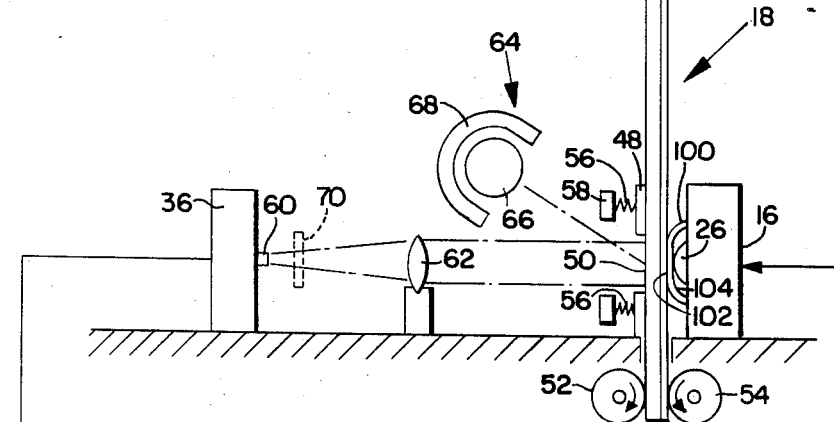
FIG. 9 is a diagrammatic representation of a first recording system embodying the present invention, which is similar in most respects to the system of FIG. 8 except that it includes a background plate.
Figure 9:
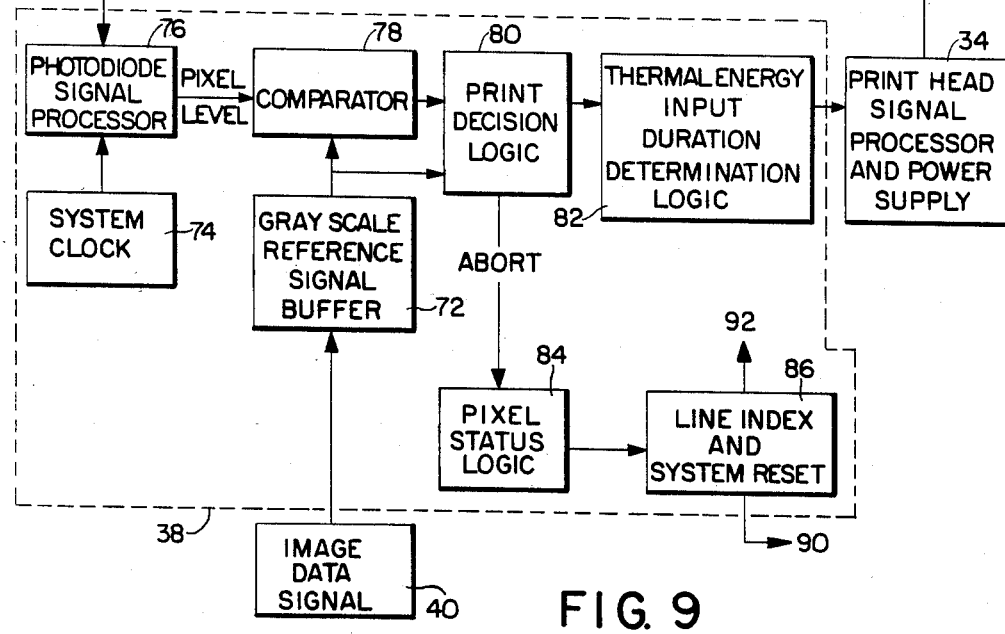

As best shown in FIGS. 9 and 10, system 32a is similar in most respects to system 32 except that it is adapted to receive a roll of transparency medium 18 rather than medium 10; and it additionally includes a thin, elongated, thermally conductive, background plate or member 100 mounted on the front of print head 16 in engaging covering relation to the elongated heating element strip 26.

Background plate 100 serves as the functional equivalent of background sheet 15 for that line portion of medium 18 registered with the print head 16 and the photodetector 36. The front side surface 102 of plate 100, which is configured to be located in non-adhering engagement with that portion of layer 14 urged into contact with surface 102 by the pressure plate 48 acting on layer 12, provides a light reflective contrasting background against which the recorded dots are clearly visible to facilitate monitoring. Plate 100 also is a thermal conductor to which thermal energy, applied by the print head elements E in engagement with the back side surface 104 of plate 100, is transmitted to layer 14. In this context plate 100 serves as a thermal buffer or difusser which substantially improves the quality of the recorded dots.

Plate 100 preferably is formed of a thin, stiff sheet or film of a thermally conductive, opaque material, such as a high melting temperature thermally conductive plastic, or the like. The front surface 102 should be smooth so as to efficiently reflect light and be of a color that provides good contrast with respect to the tone and color of the recorded information. Alternatively, the permanent background member 100 may take the form of a light colored, thin, thermally conductive, opaque coating applied to the front surface of the print head elements.

In this embodiment background plate 100 is a permanent structure in system 32a which provides the contrasting background for facilitating dot monitoring. The image is recorded a line at a time in the manner previously described with reference to system 32. After the last line is recorded, the image bearing portion of medium 18 is advanced beyond the rollers 52 to 54 and severed from roll 46 whereupon it is ready for immediately viewing or projection.

System 32b, shown in FIGS. 11 and 12, is similar in most respects to system 32 except that it includes means for providing a contrasting background in the form of a thin, expendable, opaque or translucent, flexible tape or member 110 that extends across the width of print head 16 in overlying engaging relation to the heating element strip 26. As best shown in FIG. 12, the tape 110 is provided from a supply reel 112 mounted adjacent one end of print head 16. From reel 112, the tape 110 passes around a first idler roller 114, across the heating element strip 26, around a second idler roller 116 and then to a take-up reel 118 adjacent the opposite end of print head 16. The idler rollers 114 and 116 define a tape path of travel across the print head which assures that the back side surface 120 of tape 110 is in contact with the heater strip 26. The pressure plate 48 urges medium 18 rearwardly to press that portion of recording layer 14 in alignment with strip 26 into non-adhering engagement with the front side 122 of tape 110 which serves as the contrasting background for facilitating dot monitoring.

At least take-up reel 118, and alternatively both reel 118 and supply reel 112, are adapted to be rotatably driven by a stepper motor drive (not shown) for intermittently transporting a length of tape 110 across the front of the print head 16 in response to the line index signal 90 provided by subsystem 86 of control system 38.

After each line is recorded, the roller 52 and 54 are indexed to advance medium 18 one line position and the tape reels are rotated to advance a fresh portion of tape 110 into its operative position extending across the width of medium 18.

System 32b provides a fresh length of tape for each recorded line to assure that any dirt or print that may have been deposited on the front surface of the tape during the previous line recording does not remain in the field of view of photodetector 36 and adversely influence the pixel density measurements for the next recorded line. Alternatively, tape 110 may be moved only when the operator determines a fresh background is needed. Also, this structure allows one to change the tape when necessary to select background color that is most appropriate for use with a particular medium 18 that is being employed in the recording process.

Since certain changes or modifications may be made in the above described recording systems and methods without departing from the spirit and scope of the invention involved herein, it is intended that all matter contained in the above description and accompanying drawings be interpreted as illustrative and not in a limiting sense.

What is claimed is:

1. A thermal recording system for recording an image represented by pixel areas of varied density on a transparency type thermally sensitive recording medium having a transparent support layer and a transparent thermally sensitive recording layer of the type wherein recorded dot size increases with increased amounts of thermal energy applied to form a dot, said recording system comprising:
    means for supporting such a transparency type of recording medium;
    means for receiving image signals indicative of a desired density for each pixel area of the desired image;
    means operable for applying thermal energy to selected areas of the recording layer to form a dot in each selected pixel area;
    means, located between the recording layer and said energy applying means, for providing a contrasting, light reflective, background against which recorded dots may be viewed by reflected light;
    means, configured to receive light reflected by said background, for optically monitoring said selected pixel areas and for providing density signals indicative of the density of each selected pixel area;
    means for comparing said density signals with said image signals and for providing density comparison value signals for each selected pixel area; and
    means for operating said energy applying means, said operating means initially being responsive to said image signals for regulating an initial application of thermal energy to selected pixel areas to form in each a dot having an initial size smaller than necessary to achieve its said desired density and, thereafter, being responsive to said density comparison value signals for regulating further application of thermal energy to progressively increase dot size in each selected pixel area until a predetermined value of density comparison is achieved for each said selected pixel area.

2. The recording system of claim 1 wherein said means for providing said background is a thermal conductor and is configured to have said thermal energy applied thereto for transmission therethrough to the recording layer to effect image recording.

3. The recording system of claim 2 wherein said background providing means is a background plate fixedly mounted with respect to said energy applying means.

4. The recording system of claim 2 wherein said background providing means is an elongated, flexible, opaque or translucent tape that is configured to be advanced intermittently relative to said energy applying means and the recording medium.

5. The recording system of claim 4 further including means operable for intermittently advancing said flexible tape.

6. The recording system of claim 1 wherein said energy applying means includes a linear array of thermal energy applying elements and said background providing means is a thermally conductive, opaque, background plate disposed in covering relation to said energy applying elements so as to block said elements from the field of view of said optical monitoring means.

7. The recording system of claim 1 wherein said energy applying means includes a linear array of thermal energy applying elements and said background applying means is a thermally conductive, opaque or translucent, flexible tape mounted for intermittent advancement along a path wherein said flexible tape is disposed in covering relation to said energy applying elements so as to block said elements from the field of view of said optical monitoring means.

8. The recording system of claim 1 wherein said background providing means is an opaque, thermally conductive member having one side thereof in engagement with said energy applying means and an opposite side thereof configured to be located in non-adhering engagement with the recording layer.

9. The recording system of claim 1 wherein said background providing means is a thin, opaque, thermally conductive light reflective coating on said energy applying means.

10. A method of thermally recording an image represented by pixel areas of varied density on a transparency type thermally sensitive recording medium including a transparent support layer and a transparent thermally sensitive recording layer carried on said support layer, said recording layer being of the type wherein dot size increases with increased amounts of thermal energy applied to form a dot, said recording method comprising the steps of:
    providing image information indicative of a desired density for each pixel area of the desired image;

providing a background member in non-adhering engagement with said recording layer, said background member providing a contrasting background against which recorded dots are visible by reflected light;

applying thermal energy to said background member, in accordance with said image information, for transmission therethrough to selected pixel areas of said recording layer to form in each a dot having an initial size smaller than necessary to achieve its said desired density;

monitoring the density of each selected pixel area by optically sensing its dot with light reflected by said contrasting background member;

comparing the monitored density of each selected pixel area to its said desired density; and based on said comparison, applying additional thermal energy to said selected pixel areas to progressively increase dot size in each until a predetermined value of density comparison is achieved and thereupon terminating application of thermal energy.

11. The method of claim 10 wherein said background member is an elongated tape that is mounted for movement relative to a means for applying said thermal energy to provide a fresh background as needed, and said method further includes the step of moving said tape to provide a fresh background.

* * * * *